United States Patent [19]

Teshima

[11] Patent Number: 5,159,254
[45] Date of Patent: Oct. 27, 1992

[54] NUMERICAL CONTROL UNIT FOR ESTIMATING MOVEMENT PARAMETERS USING A MODEL

[75] Inventor: Takeo Teshima, Aichi, Japan
[73] Assignee: Mitsubishi Denki K.K., Tokyo, Japan
[21] Appl. No.: 682,178
[22] Filed: Apr. 9, 1991

[30] Foreign Application Priority Data

Apr. 9, 1990 [JP] Japan ................................ 2-93547

[51] Int. Cl.$^5$ ............................................. G05B 11/01
[52] U.S. Cl. ...................... 318/611; 318/618; 318/630; 318/632; 318/610
[58] Field of Search .............................. 318/560–680; 364/474, 513; 901/3, 9, 12, 15–23

[56] References Cited

U.S. PATENT DOCUMENTS

| | | | |
|---|---|---|---|
| 4,445,779 | 5/1984 | Johnson | 318/631 |
| 4,483,425 | 11/1984 | Newman | 318/649 |
| 4,612,489 | 9/1986 | Gunda | 318/590 |
| 4,621,332 | 11/1986 | Sugimoto et al. | 364/513 |
| 4,694,229 | 9/1987 | Cormack | 318/561 |
| 4,806,835 | 2/1989 | Habermann | 318/607 |
| 4,808,895 | 2/1989 | Fujita et al. | 318/384 |
| 4,843,293 | 6/1989 | Futami | 318/609 |
| 4,868,475 | 9/1989 | Rogozinski et al. | 318/632 |
| 4,914,726 | 4/1990 | Burke | 318/646 |
| 4,950,090 | 8/1990 | Papiernik et al. | 388/815 |
| 4,961,034 | 10/1990 | Kakino et al. | 318/600 |
| 4,965,501 | 10/1990 | Hashimoto | 318/595 |
| 4,988,935 | 1/1991 | York | 318/561 X |

Primary Examiner—Paul Ip
Attorney, Agent, or Firm—Sughrue, Mion, Zinn, Macpeak & Seas

[57] ABSTRACT

A numerical control unit for controlling the position of a movable part, such as a machine table, in response to input machining information. The unit employs a servo control loop that detects the values of the position, velocity, acceleration and motor current for the movable part at predetermined times. Using such detected values and, on the basis of a representative spring mass system model, values of inertia, mass, viscous friction and sliding friction can be calculated and used for automatically optimizing the gain and offset parameters applicable to control of the machine.

12 Claims, 7 Drawing Sheets

NUMERICAL CONTROL UNIT FOR ESTIMATING MOVEMENT PARAMETERS USING A MODEL

BACKGROUND OF THE INVENTION

The present invention relates to a process for a numerical control unit to estimate the mass, inertia, viscous friction coefficient and sliding (Coulomb) frictional force of a movable part, e.g. a table of a machine to be controlled. Incorporated herein by reference is the subject matter of Japanese priority application No. 2-93547 filed Apr. 9, 1990.

FIG. 8 is a block diagram illustrating a conventional numerical control unit. In FIG. 8, an interpolation processor 1 is used for entering machining information, e.g. a travel distance and traveling velocity, for each block of a machining program, and for outputting a travel increment per sampling or a position command value of a control axis. An acceleration/deceleration processor 2 receives the interpolation information, e.g. the travel increment per sampling or the position command value provided by the interpolation processor 1, and performs acceleration/deceleration processing for a primary delay circuit, for example, and outputs a position command value for a motor 105 or a travel increment per sampling. A servo controller 3 is responsive to the output of the acceleration/deceleration processor 2 and controls the positioning of the motor 105. The servo controller 3 comprises a position loop controller 101, a velocity loop controller 102, a current loop controller 103, a current detector 104 for detecting a motor current feedback value, the motor 105 for driving a movable part (not illustrated), a velocity detector 106 operatively connected to the movable part (not illustrated) or to the motor 105, and a position detector 107.

In operation, the interpolation processor 1 receives machining information, such as a travel distance and traveling velocity, for each block of the machining program and outputs to the acceleration/deceleration processor 2 a. travel increment per sampling or a position command value of the control axis. The acceleration/deceleration processor 2 receives the interpolation information, such as the travel increment per sampling or the position command value provided by the interpolation processor 1, performs acceleration/deceleration processing for a primary delay circuit having a preset time constant, for example, and outputs a position command value for the motor 105 or travel increments per sampling to the servo controller 3. The servo controller 3 controls the position of the movable part in response to the output of processor 2 by using in sequence the position loop control 101, the velocity loop control 102 and the current loop control 103 to generate operational inputs to the motor 105, in accordance with the position command value or the travel increment per sampling. In this conventional system, the movable part is controlled by using preset loop gains and compensation gains in the position loop control 101, the velocity loop control 102 and the current loop control 103.

In the conventional numerical control unit configured as mentioned above, the time constant of the acceleration/deceleration processor, as well as the loop gains of the position loop control 101, the velocity loop control 102 and the current loop control 103, and each compensation gain, are set while inertia, a viscous friction coefficient or sliding frictional force of the movable part of the machine to be controlled remain unknown or are identified merely as approximate values. In recent years, however, as higher machining speed and higher machining accuracy are demanded, it has become necessary to provide fast, accurate and stable positioning control. Nevertheless, since the conventional numerical control unit carries out positioning control of the movable part without precisely knowing the inertia, viscous friction coefficient and sliding frictional force of the movable part of the machine to be controlled, the acceleration/deceleration time constant, the position loop gain and the velocity loop gain, for example, of the servo controller must be manually adjusted by skilled operators. Even when such operators have a significant level of skill, they require a considerable amount of time to make such adjustments.

The machining of a workpiece having a projection with a curved profile offers a particularly difficult problem. In determining the appropriate machining adjustments when machining a projection which requires switching of circular arc quadrants, the mass and the frictional force of the movable part must be taken into consideration. An accurate offset during high-speed machining cannot be determined by the conventional numerical control unit because it can only compensate for that projection by using the acceleration parameter and the mass of the movable part.

SUMMARY OF THE INVENTION

It is, accordingly, an object of the present invention to overcome the disadvantages of the conventional process by providing a numerical control unit which will allow an estimation of the mass or inertia or viscous friction coefficient or sliding frictional force of a movable part of a machine. These parameters will permit the determination of an optimum value of gain and offset parameters for ensuring high accuracy and stability for rapid positioning control of the movable part of the machine.

The foregoing object is accomplished in three embodiments by providing a numerical control unit that will allow a determination of a current feedback value for a motor that drives a movable part, and an estimation of a movable part velocity and movable part acceleration. It also will allow the mass, viscous friction coefficient or sliding frictional force of the movable part to be calculated. The calculation is performed by using an expression that relates the mass or viscous friction coefficient or sliding frictional force to the motor current feedback value, the velocity and the acceleration when the movable part is replaced by a predetermined model. Furthermore, the calculation may be based on a multiple of the detected or estimated values of motor current feedback values, velocity and acceleration.

According to the present invention, by representing a dynamic characteristic of the movable part as a model in a spring mass system, for example, an expression of the relationship between the mass, viscous friction coefficient and sliding frictional force of the movable part can be obtained by a parameter estimation process such as a method of least squares. The inertia of the movable part can be determined from the mass parameter.

BRIEF DESCRIPTION OF THE EMBODIMENTS

DESCRIPTION OF THE PREFERRED EMBODIMENTS

Figure 1:
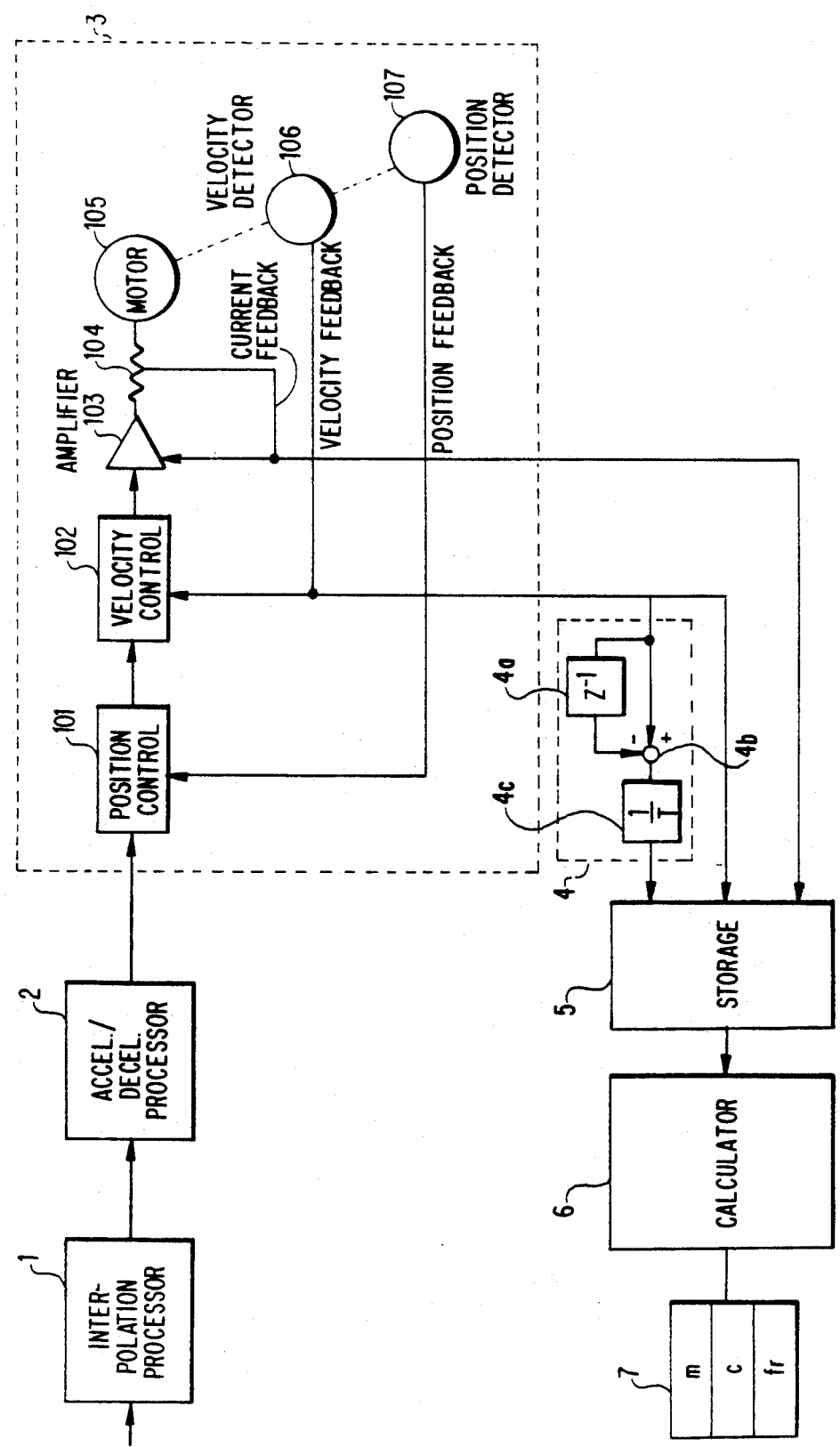
FIG. 1 is a block diagram illustrating a numerical control unit according to a first embodiment of the present invention.

A first embodiment of the present invention may be described with reference to FIG. 1, where the components 1 to 3 and 101 to 107 designate identical part in the conventional unit and will not be described here. An acceleration detector 4 is responsive to the velocity feedback signal generated by velocity detector 106 and is operative to calculate the acceleration of the movable part. The acceleration detector has a memory 4a for storing a velocity value for the movable part, as provided by the velocity detector 106 during a sampling time, T. A subtractor 4b is used for determining a difference between the velocity value of the movable part previously detected and stored in the memory 4a, and that of the movable part provided by the velocity detector 106 at a subsequent predetermined time. A multiplier 4c is used for multiplying difference from subtractor 4b by 1/T. A storage medium 5 is used for sampling and storing the movable part velocity, the movable part acceleration and the motor current feedback values provided by the velocity detector 106, the acceleration detector 4 and the current detector 104, respectively, at predetermined points in time. A calculator 6 is operative to read from memory 5 a multiple of the movable part velocities, the movable part accelerations and the motor current feedback values and to calculate the mass (m), the viscous friction coefficient (c) and the sliding frictional force (fr) of the movable part using a parameter estimation process, e.g. a method of least squares. A second storage medium 7 is used for storing the mass, the viscous friction coefficient and the sliding frictional force of the movable part calculated by the calculator 6.

Figure 3:
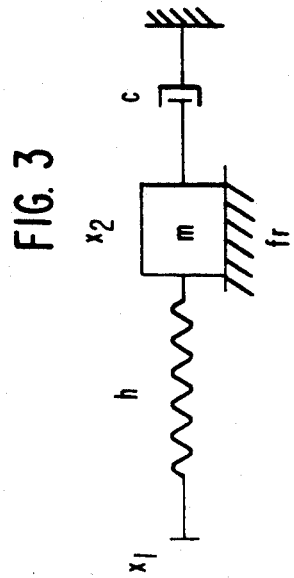
FIG. 3 is a diagram showing an example of a model of a movable part.
Figure 8:
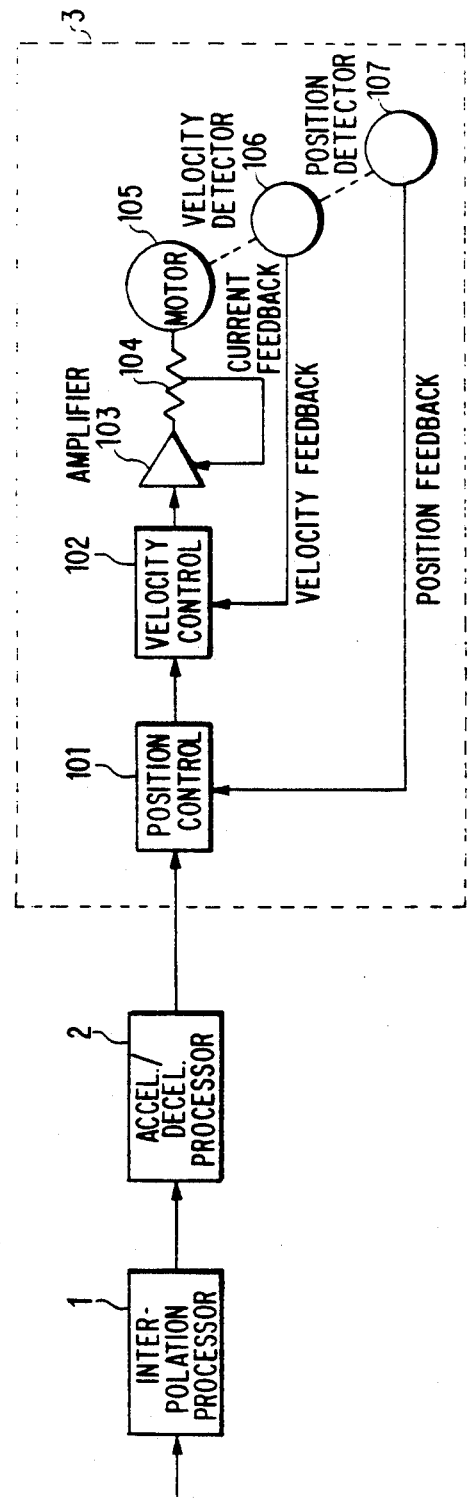
FIG. 8 is a block diagram showing a conventional numerical control unit.

FIG. 3 indicates an example of representing a dynamic characteristic of the movable part as a model in a spring mass system. Variable $x_1$ indicates a value obtained by converting an angular value of a motor shaft into a traveling direction of the movable part, variable $x_2$ indicates a position of the movable part, m indicates the mass of the movable part, k indicates a spring constant between the movable part and the motor shaft, c indicates the viscous friction coefficient of the movable part, and fr indicates the sliding frictional force applied to the movable part. The value, $x_1$ is obtained by converting the mass (m), the viscous friction coefficient (c), the sliding frictional force (fr) of the movable part, and the angular value of the motor shaft into a traveling direction of the movable part. The relationship between $x_1$ and the position of the movable part, $x_2$, is represented by the following equations of motion:

$$K(x_2-x_1) = m\ddot{x}_2 + c\dot{x}_2 + fr \text{ (if } \dot{x}_2 > 0)$$

$$K(x_2-x_1) = m\ddot{x}_2 + c\dot{x}_2 - fr \text{ (if } \dot{x}_2 < 0)$$

In the above equations, a value, $x_1$, obtained by converting the rotary angular velocity of the motor shaft into the traveling direction of the movable part and a velocity, $\dot{x}_2$, of the movable part, can generally be approximated to a value, $\dot{x}_1$. This approximation is obtained by converting the rotary angular acceleration of the motor shaft into the traveling direction of the movable part and an acceleration, $\ddot{x}_2$, of the movable part. The approximation is made on the assumption that $\dot{x}$ is a value that can be detected by the velocity detector 106 installed on the movable part or the motor and $\ddot{x}$ is a value that can be output by the acceleration detector 4. The relationship may be summarized as follows:

$$\dot{x} \approx \dot{x}_1 \approx \dot{x}_2$$

$$\ddot{x} \approx \ddot{x}_1 \approx \ddot{x}_2$$

Then, assuming that I is a value detected by the current detector 104, i.e. the motor current feedback value, the motor current feedback value I is proportional to a load torque applied to the motor and has the following relationship with the left portion, k $(x_2-x_1)$, of the equations of motion:

$$K_T \times I = k(x_2-x_1)$$

where $K_T$ is a constant of proportion to force obtained by converting the motor current feedback value, I, and the motor load torque into the shaft direction. In this case, K $(x_2-x_1)$ is proportional to motor current. If the movable part is screw-driven:

$K_T =$ (motor torque constant) $\times 2 \times \pi \div$ (travel distance of the movable part per motor revolution)

Hence, when the movable part is represented by a model shown in FIG. 3, an expression of relationship among the mass (m), viscous friction coefficient (c), sliding frictional force (fr) of the movable part, the motor current feedback value, I, detected by the current detector 104, the velocity, x, of the movable part obtained by the velocity detector 106 and the acceleration, x, obtained by the acceleration detector 4 is as follows:

$$K_T \times I \approx m\ddot{x} + c\dot{x} + fr \text{ (if } \dot{x} > 0)$$

$$K_T \times I \approx m\ddot{x} + c\dot{x} - fr \text{ (if } \dot{x} < 0)$$

In operation, the interpolation processor enters machining information and drives the motor for driving the movable part of the servo controller 3 via the acceleration/deceleration processor 2. At this time, the storage 5 samples and stores the movable part velocities, accelerations and the motor current feedback values from the velocity detector 106, the acceleration detector 4 and the current detector 104, respectively, at a multiple of predetermined times. Then, the calculator 6 calculates the mass/viscous friction coefficient/coulomb frictional force of the movable part by a method of least squares, for example, indicated in the expression 1 and outputs results to the second storage 7.

If $\dot{x} > 0$, $$\begin{pmatrix} \sum_{i=1}^{n}(\ddot{X}_i^2) & \sum_{i=1}^{n}(\ddot{X}_i\dot{X}_i) & \sum_{i=1}^{n}(\ddot{X}_i) \\ \sum_{i=1}^{n}(\ddot{X}_i\dot{X}_i) & \sum_{i=1}^{n}(\dot{X}_i^2) & \sum_{i=1}^{n}(\dot{X}_i) \\ \sum_{i=1}^{n}(\ddot{X}_i) & \sum_{i=1}^{n}(\dot{X}_i) & \sum_{i=1}^{n}(i) \end{pmatrix} \begin{pmatrix} m \\ c \\ fr \end{pmatrix} = K_{Tx} \begin{pmatrix} \sum_{i=1}^{n}(\ddot{X}_i I_i) \\ \sum_{i=1}^{n}(\dot{X}_i I_i) \\ \sum_{i=1}^{n}(I_i) \end{pmatrix} \quad (1)$$

If $\dot{x} < 0$, $$\begin{pmatrix} \sum_{i=1}^{n}(\ddot{X}_i^2) & \sum_{i=1}^{n}(\ddot{X}_i\dot{X}_i) & \sum_{i=1}^{n}(-\ddot{X}_i) \\ \sum_{i=1}^{n}(\ddot{X}_i\dot{X}_i) & \sum_{i=1}^{n}(\dot{X}_i^2) & \sum_{i=1}^{n}(-\dot{X}_i) \\ \sum_{i=1}^{n}(-\ddot{X}_i) & \sum_{i=1}^{n}(-\dot{X}_i) & \sum_{i=1}^{n}(i) \end{pmatrix} \begin{pmatrix} m \\ c \\ fr \end{pmatrix} = \quad (2)$$

$$K_{Tx} \begin{pmatrix} \sum_{i=1}^{n}(\ddot{X}_i I_i) \\ \sum_{i=1}^{n}(\dot{X}_i I_i) \\ \sum_{i=1}^{n}(-I_i) \end{pmatrix}$$

where, $K_T$ is a constant of proportion to force obtained by converting the motor current feedback value and the motor load torque into the shaft direction. If the movable part is driven from a ball screw, $K_T$ = (motor torque constant) × 2 × π ÷ (travel distance of the movable part per motor revolution)

Figure 2:
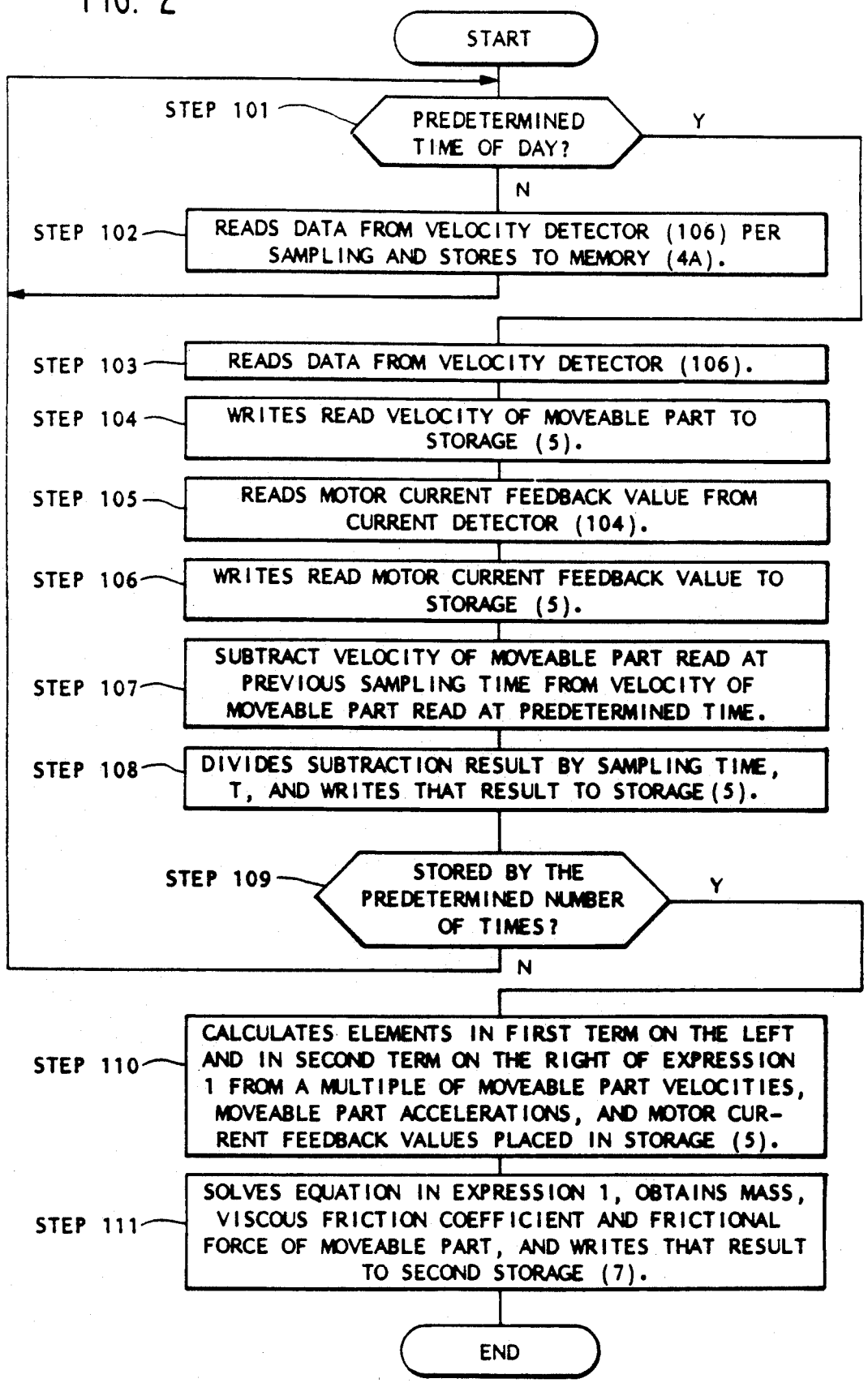
FIG. 2 is a flowchart illustrating operation of the numerical control unit according to the first embodiment of the present invention.

Operation of the storage 5 and the calculator 6 may be described in more detail with reference to the flowchart in FIG. 2. Step 101 judges whether a particular time of day is among the predetermined sampling times. If it is not so predetermined, the operation progresses to step 102, which reads the velocity of the movable part at each sampling time from the velocity detector 106 and writes that value into the memory 4a of the acceleration detector 4. If the step 101 has judged that the sampling time is predetermined, the operation progresses to step 103, which reads the velocity of the movable part at the predetermined time and step 104 writes it into the storage 5. Then, step 105 reads the motor current feedback value at the predetermined time from the current detector 104, and step 106 writes it into the storage 5. At step 107, the subtractor 4b subtracts the velocity of the movable part written to the memory 4a at the previous sampling time, T, before the predetermined time at the step 102, from the velocity of the movable part read at the predetermined time at the step 103. At step 108, the multiplier 4c multiplies that result by 1/T to obtain the acceleration of the movable part and writes the result to the storage 5. Step 109 judges whether or not the velocities/accelerations of the movable part and the motor current feedback values have been stored a predetermined number of times, n. If the above values have been stored the predetermined number of times, the operation progresses to step 110. Otherwise, the execution returns to the step 101. Step 110 calculates the nine elements in the first term on the left-hand side of the expression 1 and three elements in a second term on a right-hand side thereof using a multiple, n, of the movable part velocities/accelerations and the motor current feedback values placed in the storage 5. Step 111 solves cubic simultaneous equations which have the second term on the left-hand side of the expression 1 as a variable by using the elements obtained at the step 110, calculates the mass, m, the viscous friction coefficient, c, and the frictional force, fr, of the movable part in the second term on the left-hand side, writes the result into the second storage 7, and terminates the processing. Where $K_T$ in the first term on the right-hand side of the Expression 1 is a value obtained beforehand if a drive system for the motor and the movable part is determined, it is evident that the inertia of the movable part can be obtained from the mass, m, if the drive system for the movable part is determined.

Inertia may be obtained from the maximum torque and maximum current feedback value derived by accelerating/decelerating the motor 105 (movable part). If the acceleration/deceleration of processor 2 is the position loop gain 1/Tp of the servo at the primary-delay of the time constant Ts, the maximum torque Tmax (kg.cm) is represented by:

$$T_{max} = \frac{2\pi N(J_L + J_M)}{60} \cdot \frac{1}{T_p} \left(\frac{T_p}{T_s}\right)^{\frac{T_s}{T_s - T_p}} \quad (3)$$

where,
N = motor speed (rpm)
$J_L$ = load inertia converted to the equivalent value at the motor shaft (kgf.cm.sec$^2$)
$J_M$ = motor inertia (kgf.cm.sec$^2$)
The load torque T and current feedback I (AMPS) of the motor 105 is represented by:

$T = K_I I$ where, $K_I$ (kgf.cm/AMPS) is a torque constant. Therefore, the maximum current feedback value Imax at the time of acceleration is represented by:

$$I_{max} = \frac{K_I 2\pi N(J_L + J_M)}{60} \cdot \frac{1}{T_p} \left(\frac{T_p}{T_s}\right)^{\frac{T_s}{T_s - T_p}} \quad (4)$$

By detecting the current feedback value at the acceleration time and obtaining the then maximum value Imax, the inertia ($J_I + J_M$) can be found.

A problem exists in that current feedback value includes a factor of frictional force. In addition, the maximum value Imax includes an error due to noise. For such reasons, the inertia cannot be obtained accurately.

The viscous frictional force and sliding frictional force also may be found. By moving the motor 105 (movable part) at various speeds Fi and detecting the then current feedback values Ii, the relationship between Fi and Ii is obtained. In fact, Ii must be detected in a stationary state wherein the relationship is not affected by acceleration speed during the acceleration/deceleration time.

Sliding frictional force $f_R$ may be represented by:

$$f_R = \frac{2\pi}{P} K_I b \quad (5)$$

where P (cm) is the distance traveled by the movable part per motor revolution and b is the current feedback value Ii when Fi is zero.

The coefficient of viscous friction C (kgf.sec/cm) can be found by:

$$C = \frac{2\pi}{P} K_I \quad (6)$$

By finding the load inertia (including the motor inertia) $J_L + J_M$ applied to the motor, the maximum torque at the acceleration/deceleration time is obtained by:

$$T_{max} = \frac{2\pi N(J_L + J_M)}{60} \cdot \frac{1}{T_p} \left(\frac{T_p}{T_s}\right)^{\frac{T_s}{T_s - T_p}} \quad (7)$$

Generally, since the motor or servo amplifier has a limitation on the current that can be output, the acceleration/deceleration time constant Ts can be determined so that $K_I T_{MAX}$ does not exceed the limit value. Namely, the optimum Ts can be found.

Using the viscous frictional force and sliding frictional force is straightforward. In a semi-closed loop system, etc., the machine cannot be positioned with high accuracy because it is deformed elastically by the frictional force of each machine area. Generally, the frictional force $F_R$ and positioning error $\epsilon$ is represented by:

$$F_R \alpha \epsilon \quad (8)$$

Therefore, if the frictional force is known, the error $\epsilon$ can be found, and by compensating for $\epsilon$, precision positioning can be effected.

Figure 4:
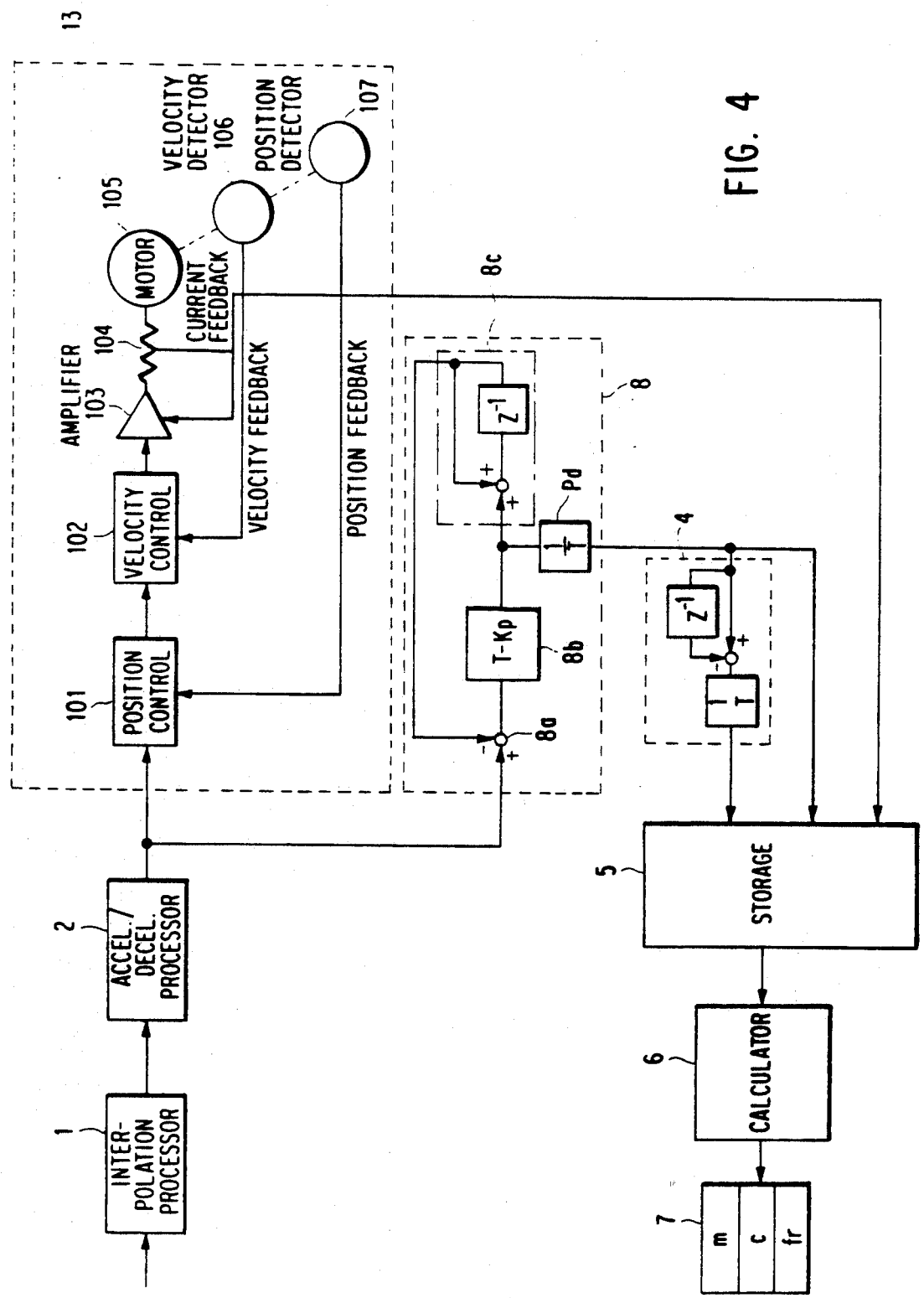
FIG. 4 is a block diagram illustrating a numerical control unit according to a second embodiment of the present invention.

A second embodiment of the present invention will now be described with reference to FIG. 4, where the numerals 1 to 7 and 101 to 107 are the same as those in FIG. 1 and will not be explained here. A velocity estimator 8 is used for estimating the velocity of the movable part, i.e. for entering a position command value per sampling that is an output of the acceleration/deceleration processor 2, estimating a feed rate of the movable part, and outputting an estimated velocity value of the movable part to the acceleration detector 4 and the storage 5. The velocity estimator 8 comprises a subtractor 8a, a multiplier 8b and an integrator 8c, including an adder for accumulating the estimated velocity values, and has discretely replaced a position loop control system of the servo controller.

The movable part is replaced by the model shown in FIG. 3, for example. FIG. 3 will not be described because it has already been explained in the first embodiment.

Operation of the second embodiment in FIG. 4 will now be described. The interpolation processor 1 enters machining information and drives the motor for driving the movable part of the servo controller 3 via the acceleration/deceleration processor 2. At this time, the velocity estimator 8 enters the position command value per sampling from the acceleration/deceleration processor 2, subtracts a calculated value of the movable part position at the preceding sampling time of day provided by the integrator 8c from the position command value, multiplies the subtraction result by a position loop gain, Kp, of the servo controller and a sampling time T, by means of the multiplier 8b to obtain the travel increment of the movable part per sampling, enters that result into the multiplier 8d, multiplies that result by 1/T, calculates the velocity of the movable part at each sampling time, and enters that result into the acceleration detector 4 and the storage 5 as the estimated velocity value of the movable part. Further, the velocity estimator 8 enters the result of the multiplier 8a into the integrator 8c and calculates the position of the movable part per sampling. The sampling storage 5 samples and accumulates the movable part velocities/acceleration and the motor current feedback values from the velocity detector 106, the acceleration detector 4 and the current detector 104, respectively, at a multiple of predetermined times. Then, the calculator 6 calculates the mass/viscous friction coefficient/ coulomb frictional force of the movable part as in FIG. 1 by the method of least squares, for example, indicated in the expression 1, and outputs the result to the second storage 7.

Figure 5:
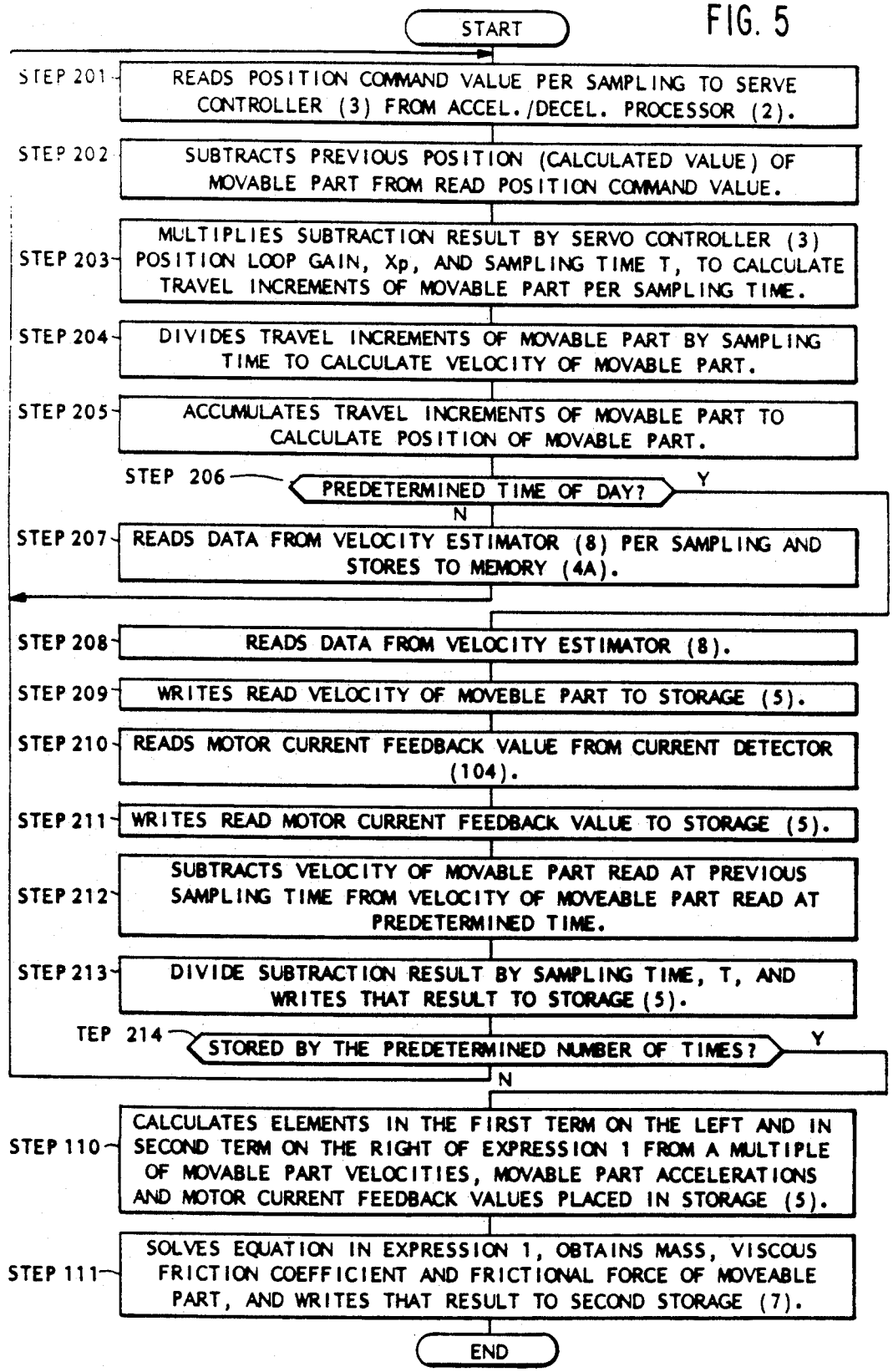
FIG. 5 is a flowchart illustrating operation of the numerical control unit according to the second embodiment of the present invention.

The operation will further be described according to the flowchart in FIG. 5. The interpolation processor 1 enters machining information and drives the motor for driving the movable part of the servo controller 3 via the acceleration/deceleration processor 2. At this time, the velocity estimator 8 enters the position command value per sampling from the acceleration/deceleration processor 2 at step 201 and subtracts the calculated value of the movable part position at the preceding sampling time provided by the integrator 8c from the position command value at step 202. At step 203, the velocity estimator 8 multiplies the subtraction result by the position loop gain, Kp, of the servo controller 3 and the sampling time of day, T, by means of the multiplier 8b to obtain the travel increment of the movable part per sampling, and at step 204, enters that result into the multiplier 8d and multiplies that result by 1/T to calculate the velocity of the movable part at each sampling time of day. At step 205, the velocity estimator 8 enters the result of the multiplier 8a into the integrator 8c and calculates the position of the movable part per sampling. Step 206 judges whether the corresponding sampling time is among the predetermined times. If it is not thus predetermined, the operation progresses to step 207, which reads the velocity of the movable part at each sampling time from the velocity estimator 8 and writes that value into the memory 4a of the acceleration detector 4. If the step 206 has judged that the sampling time is as predetermined, the operation progresses to step 208, which reads the velocity of the movable part from the velocity estimator 8 at the predetermined sampling time, and step 209 writes it into the storage 5. Then, step 210 reads the motor current feedback value at the predetermined time from the current detector 104 and step 211 writes that value into the storage 5. At step 212, the subtractor 4b subtracts the velocity of the movable part written to the memory 4a read at the sampling time, T, before the predetermined time at the step 207, from that of the movable part read at a predetermined time at the step 208. At step 213, the multiplier 4c multiplies that result by 1/T to obtain the acceleration of the movable part and writes the result to the storage 5. Step 214 judges whether or not the velocities/accelerations of the movable part and the motor current feedback values have been stored by the predetermined number of times, n. If the above values have been stored by the predetermined number of times, the operation progresses to the step 110. Otherwise, the execution returns to the step 201. The steps 110 and 111 are not described here because they have been explained in FIG. 2.

Figure 6:
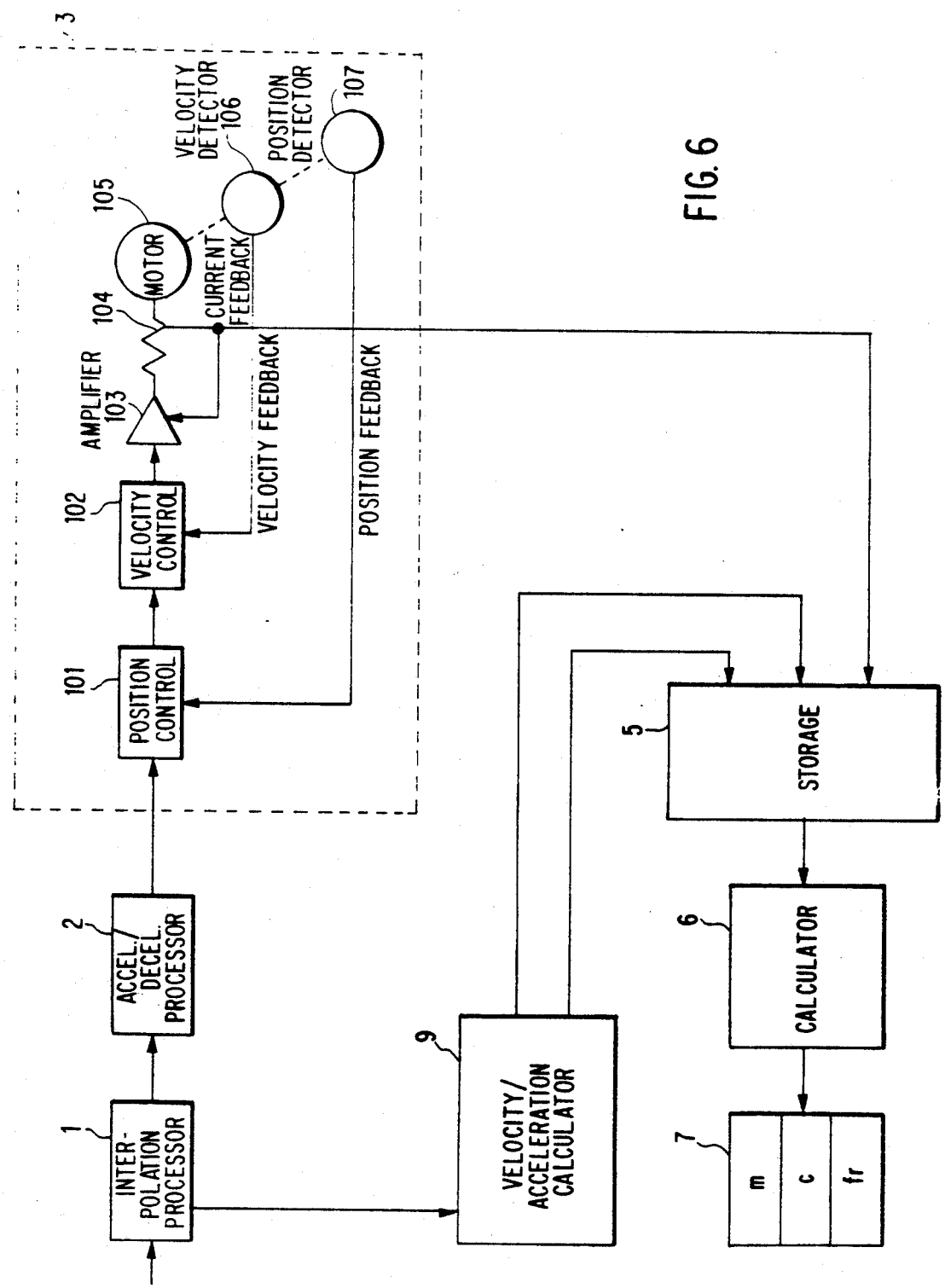
FIG. 6 is a block diagram illustrating a numerical control unit according to a third embodiment of the present invention.

A third embodiment of the present invention will now be described in reference to FIG. 6. In FIG. 6, the structure identified by numerals 1 to 3, 5 to 7, and 101 to 107, are the same as those in FIG. 1 and they will not be described here. An estimator 9 for estimating the velocity and the acceleration of the movable part when the interpolation processor 1 outputs a travel increment command value, $\Delta X = R(\sin\omega t - \sin\omega(t-T))$, or a position command value, $X = R(\sin\omega t)$, at a predetermined time, t, when the position command value is a sine wave with respect to the time, t, and also a velocity acceleration calculator for entering from the interpolation processor 1 at a time, t, assuming a start of interpolation as 0, estimating the velocity and the acceleration of the movable part at that time, t, and entering that result into the storage 5.

The movable part may be replaced by the model shown in FIG. 3, for example. FIG. 3 will not be described because it has already been explained in the second embodiment.

Figure 7:
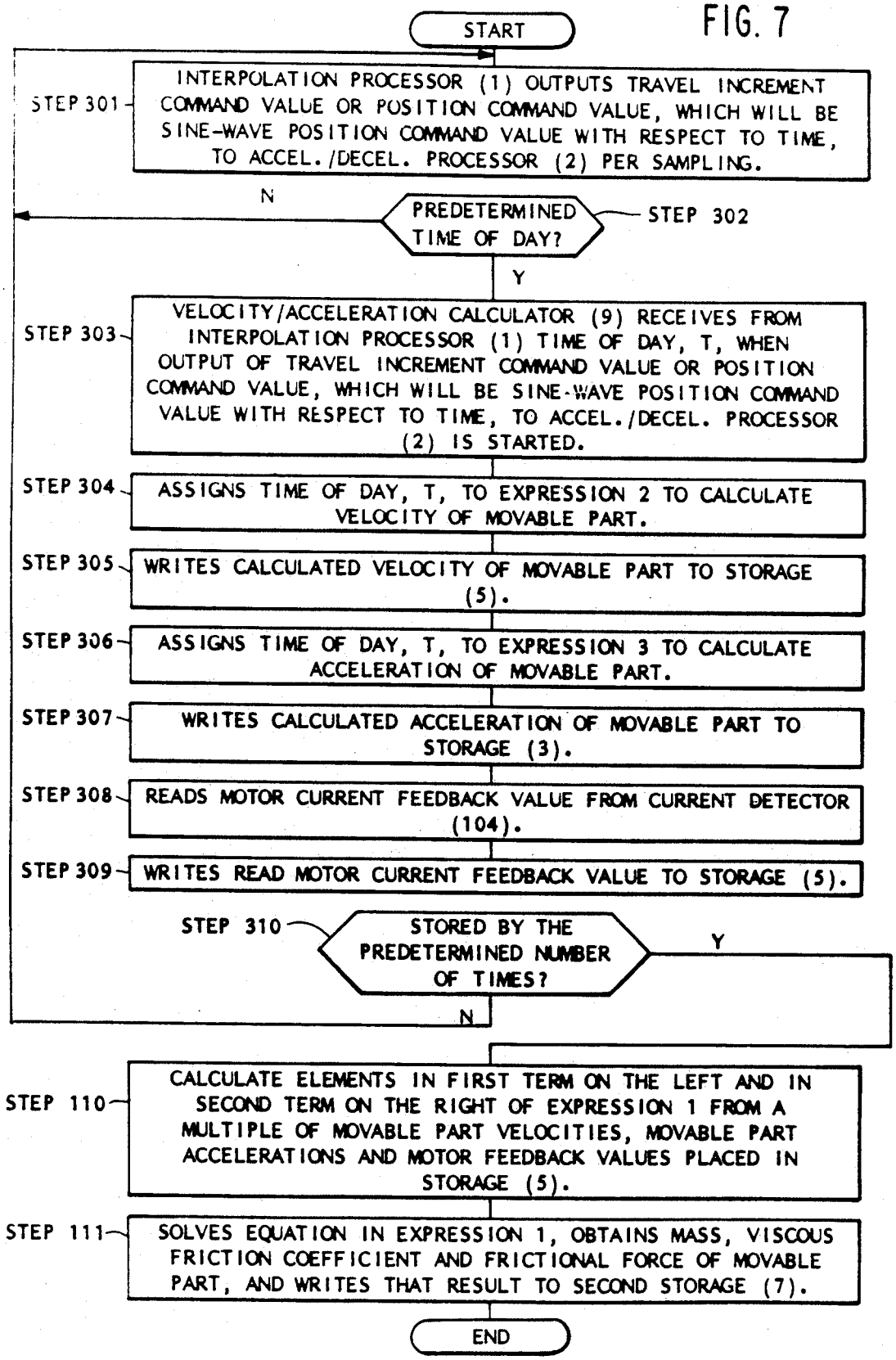
FIG. 7 is a flowchart illustrating operation of the numerical control unit according to the third embodiment of the present invention.

Operation of the third embodiment will now be described with reference to the flowchart in FIG. 7. At step 301, the interpolation processor 1 outputs to the acceleration/deceleration processor 2 per sampling time, t, the travel increment command value, $\Delta X = R(\sin\omega t - \sin\omega(t-T))$, or the position command value, $X = R(\sin\omega t)$, at the predetermined time, t, when the position command value is a sine wave with respect to the time. Step 302 judges whether the corresponding sampling time is among the predetermined times. If it is not so predetermined, the operation returns to the step 301. If the step 302 has judged that the sampling time is as predetermined, the operation progresses to step 303, at which the velocity/acceleration calculator 9 receives from the interpolation processor 1 outputs to the acceleration/deceleration processor 2 the travel increment command value, $\Delta X = R(\sin\omega t - \sin\omega(t-T))$, or the position command value, $X - R(\sin\omega t)$, by which the position command value will be a sine wave with respect to the time. At this time, if the acceleration/deceleration processor 2 is a primary delay circuit of time constant, Ts, and the position loop time constant of the servo controller 3 is TP (1/Kp), for example, the velocity, x, and the acceleration, x, of the movable part at a predetermined time, $t_1$, can be obtained by expressions 9 and 10:

$$x = R' \cdot \omega \cdot \cos(\omega t_1 - \phi) \qquad (9)$$

$$x = R' \cdot \omega_2 \cdot \cos(\omega t_1 - \phi) \qquad (10)$$

where,
$R' \approx R(1 - \omega_2(Ts^2 + Tp^2))$
$\phi = \tan^{-1}(Ts \times \omega) + \tan^{-1}(Tp \times \omega)$
R (mm): Travel amplitude
$\omega$ (rad/sec): Angular velocity
Ts (sec): Acceleration/deceleration time constant
Tp (sec): Position loop time constant Step 304 assigns the time, t, received at the step 303 into $t_1$ in the expression 9 to calculate the velocity of the movable part, and step 305 writes that result to the storage 5. Step 306 assigns the time, t, received at the step 303 into $t_1$ in the expression 10 to calculate the acceleration of the movable part, and step 307 writes that result to the storage 5. Then, step 308 reads the motor feedback value at the predetermined time of day, t, from the current detector 104, and step 309 writes it into the storage 5. Step 310 judges whether or not the velocities/accelerations of the movable part and the motor current feedback values have been stored the predetermined number of times, n. If they have been stored the required number of times, the operation progresses to the step 110 and otherwise returns to the step 301. The operations at the steps 110 and 111 are omitted here because they are identical to those in FIG. 2.

In the above three embodiments, the mass (m) viscous friction coefficient (c), frictional force (fr) of the movable part are calculated by the calculator 6 after the detected or estimated values of the velocity/acceleration of the movable part and the detected values of the motor current feedback value have been stored in the storage 5 by the required number of times. It will be appreciated that part of the calculation procedure for the mass (m) viscous friction coefficient (c) frictional force (fr), of the movable part may be performed serially per sampling, e.g. the elements in the first term on the left and in the second term on the right of the expression 1 at the predetermined estimated values of the velocity/acceleration of the movable part, the detected values of the motor current feedback value, and the stored elements in the first term on the left and in the second term on the right of the expression 1. It will also be appreciated that the values of the mass (m) viscous friction coefficient (c) frictional force (fr), of the movable part may be estimated serially per sampling.

It will be apparent that the invention, as described above, achieves a numerical control unit which will provide the mass/viscous friction coefficient coulomb frictional force of the movable part required to automatically adjust the acceleration/deceleration time constants, position loop gain and velocity loop gain, for example, of the servo controller demanded for fast, precision and stable positioning control and to enhance accuracy of compensation of a projection, etc. occurring while switching circular arc quadrants by calculating the mass/viscous friction coefficient/coulomb frictional force of the movable part using the expression of relation between the mass/viscous friction coefficient/sliding frictional force of the movable part and the motor current feedback value/velocity/acceleration obtained by replacing the movable part with a presupposed model and a multiple of motor current feedback values/velocities/accelerations detected by the detection means at the predetermined times.

What is claimed is:

1. A numerical control unit for controlling a position of a movable part in response to machining information and having an interpolation processor for interpolating position commands within said machining information and a motor for driving the movable part, comprising:
   current detection means for detecting a motor current feedback value of said motor;
   velocity detection means for detecting velocity of the movable part;
   acceleration detecting means for detecting acceleration of the movable part; and
   means for calculating at least one of mass, inertia, viscous friction coefficient or coulomb frictional force of the movable part, said calculating means performing calculation on the basis of a relationship between the mass, viscous friction coefficient and coulomb frictional force, and the detected values of motor current feedback, velocity and acceleration obtained when the movable part is replaced by a predetermined model, said detected values of motor current feedback, velocity and acceleration being detected by each said detecting means at multiple predetermined times, wherein said movable part has a single, predetermined configuration, and wherein said calculation is based on a parameter estimation process.

2. A numerical control unit according to claim 1, wherein said velocity detecting means obtains the velocity of the movable part in accordance with a difference between a first value detected at a first predetermined time by a movable part position detector means part and a recorded preceding value detected by said position detector means at a second predetermined time.

3. A numerical control unit according to claim 1, wherein said acceleration detecting means obtains the acceleration of the movable part in accordance with a difference between a first velocity value for the movable part, which is an output of said velocity detecting means at a first predetermined time, and a second velocity value of the movable part which is a second, preceding output of said velocity detecting means at a second predetermined time.

4. A numerical control unit according to claim 1, wherein said velocity detecting means comprises velocity calculating means for approximating the velocity of the movable part.

5. A numerical control unit according to claim 1, wherein said acceleration detecting means comprises acceleration calculating means for approximating the acceleration of the movable part.

6. A numerical control unit for controlling a position of a movable part having a motor for driving the movable part, comprising:
a sampling time, T, interpolation processor for outputting a travel increment command value $\Delta X = R(\sin\omega - \sin\omega(t-T))$, or a position command value, $X = R(\sin\omega t)$, a predetermined time of day, t, when a position command value will be the sine wave with respect to the time of day;
current detecting means for detecting a motor current feedback value of the motor;
velocity calculating means or estimating velocity of the movable part;
acceleration calculating means for estimating acceleration of the movable part; and
calculating means for calculating at least one of the mass, inertia, viscous friction coefficient or sliding frictional force of the moveable part, said calculating means performing calculation on the basis of a relationship between the mass, viscous friction coefficient and sliding frictional force and the detected values of motor current feedback, velocity and acceleration when the movable part is replaced by a predetermined model, said detected value of motor current feedback, velocity and acceleration being provided at predetermined times by said current detecting means, said velocity calculating means and said acceleration calculating means, wherein said movable part has a single, predetermined configuration, and said calculation is based on a parameter estimation process.

7. A method of controlling the positioning of a motor-driven movable part, using a servo loop means, in response to input machining information, said method comprising:
detecting values of at least one of the feedback motor current, movable part velocity and movable part position during plural sampling times;
calculating the value of said movable part acceleration;
representing the dynamic characteristics of the movable part as a model in a spring mass system; and
determining at least one of the parameters of mass, inertia, viscous friction coefficient and sliding friction force on the basis of said model and values from said detecting and calculating steps as said movable part is being motor-driven, said movable part having a single, predetermined configuration, wherein said at least one of the parameters are determined by a parameter estimation process.

8. The method of claim 7 further comprising storing said values from said detecting and calculating steps for at least one predetermined time.

9. The method of claim 8 wherein said determining step further comprises calculating said at least one parameter on the basis of values stored at a first predetermined time and values detected or calculated at a subsequent predetermined time.

10. The method of claim 7 wherein said determining step for position values is performed by accumulating travel increments of the movable part.

11. The method of claim 7 wherein said calculating step further comprises calculating the value of said movable part velocity.

12. The method of claim 7 wherein said parameter determining step uses an estimation process.

* * * * *